(12) United States Patent
Vinciarelli (10) Patent No.: US 9,899,924 B1
(45) Date of Patent: Feb. 20, 2018

(54) REDUCING SWITCHING LOSSES IN POWER CONVERTERS

(71) Applicant: VLT, Inc., Sunnyvale, CA (US)

(72) Inventor: Patrizio Vinciarelli, Boston, MA (US)

(73) Assignee: VLT, Inc., Sunnyvale, CA (US)

(*) Notice: Subject to any disclaimer, the term of this patent is extended or adjusted under 35 U.S.C. 154(b) by 0 days.

(21) Appl. No.: 15/227,722

(22) Filed: Aug. 3, 2016

(51) Int. Cl.
*H02M 3/158* (2006.01)
*H02M 1/00* (2006.01)

(52) U.S. Cl.
CPC ......... *H02M 3/1582* (2013.01); *H02M 3/158* (2013.01); *H02M 2001/0058* (2013.01); *Y02B 70/1491* (2013.01)

(58) Field of Classification Search
CPC . H02M 2001/0054; H02M 2001/0058; H02M 3/156; H02M 3/158; H02M 3/1582; H02M 3/1588; Y02B 70/1491
See application file for complete search history.

(56) References Cited

U.S. PATENT DOCUMENTS

| | | |
|---|---|---|
| 6,788,033 B2 | 9/2004 | Vinciarelli |
| RE40,072 E | 2/2008 | Prager et al. |
| 8,115,460 B2 | 2/2012 | Kalechshtein |
| 8,669,744 B1 | 3/2014 | Vinciarelli |
| 2012/0306463 A1* | 12/2012 | Athas ............... H02M 3/1588 323/271 |
| 2015/0263634 A1* | 9/2015 | Fu ................. H02M 3/33569 363/21.02 |
| 2016/0190932 A1* | 6/2016 | Yu ................. H02M 1/14 323/271 |

FOREIGN PATENT DOCUMENTS

| | | | |
|---|---|---|---|
| CH | 710661 A2 * | 7/2016 | ......... H02M 3/1582 |
| DE | 102015219850 * | 4/2017 | ......... H02M 3/1582 |

OTHER PUBLICATIONS

Stratakos, A., et al., "A low-voltage CMOS DC-DC converter for a portable battery-operated system," 25th Annual IEEE Power Electronics Specialists Conference, pp. 619-626 (Jun. 20-25, 1994).

* cited by examiner

*Primary Examiner* — Fred E Finch, III
(74) *Attorney, Agent, or Firm* — Foley & Lardner LLP (57) ABSTRACT

A switching power converter converts power from an input source for delivery to a load at the converter output. The converter comprises at least two switches connected in series across either the input source or the output, and an inductor connected to a central node between the two switches. A controller operates the converter in a series of converter operating cycles, each operating cycle comprising an input phase, during which one of the two switches is conductive, the inductor receives energy from the input source, and a current in the inductor is increasing positively, phase. The controller is configured to adjust the duration of the input phase, and the amount of energy stored in the inductor at the end of the input phase, as a function of a an amount of energy required to charge or discharge the node capacitance during the energy recycling phase.

27 Claims, 7 Drawing Sheets

REDUCING SWITCHING LOSSES IN POWER CONVERTERS

TECHNICAL FIELD

This invention describes apparatus and methods for reducing switching losses in switching power converters.

BACKGROUND

"Switching loss" refers to power dissipated in a switch, e.g. when the switch is turned ON. Capacitances, both parasitic and lumped, across a switch, if not discharged before the switch is turned ON, may be a major contributor to switching loss, particularly in switching power converters operating at high frequencies. One way to reduce switching losses in a switching power converter (e.g., a buck, a boost, or a buck-boost switching power converter) uses an inductive current to charge and discharge the capacitances associated with a switch before turning it ON to achieve zero voltage switching ("ZVS").

SUMMARY

One exemplary embodiment of the present disclosure is an apparatus for converting power. The apparatus converts power received via an input from an input source at an input voltage for delivery to a load via an output at an output voltage in a series of converter operating cycles. The apparatus includes an inductor for delivering energy from the input source to the output. The apparatus further includes a first series circuit having first and second terminals configured to be connected across either the input or the output and a central node for connection to a first end of the inductor. The first series circuit comprising a first switch connected between the first terminal and the central node and a second switch connected between the second terminal and the central node, the central node being characterized by a node capacitance. The apparatus further includes a controller configured to operate the switches in a series of converter operating cycles. The converter operating cycles include an input phase, during which a selected one of the first or second switches is conductive, the inductor is connected to receive energy from the input source, and a current flowing in the inductor increases positively. The operating cycles further include an energy recycling phase, during which the first and second switches are OFF and energy stored in the inductor is used to charge or discharge the node capacitance. The controller is configured to adjust the duration of the input phase, and the amount of energy stored in the inductor at the end of the input phase, as a function of an amount of energy required to charge or discharge the node capacitance during the energy recycling phase.

Another exemplary embodiment of the present disclosure is an apparatus for converting power. The apparatus converts power received via an input from an input source at an input voltage for delivery to a load via an output at an output voltage in a series of converter operating cycles. The apparatus includes an inductor for delivering energy from the input source to the output. The apparatus further includes a first series circuit having first and second terminals configured to be connected across either input or the output and a central node for connection a first end of the inductor. The first series circuit includes a first switch connected between the first terminal and the central node, and a second switch connected between the second terminal and the central node. The central node is characterized by a node capacitance. The apparatus further includes a controller configured to operate the switches in a series of converter operating cycles. The controller is configured to determine a storage duration ("TS") for storing energy in the inductor as a function of a current delivered to the load. The controller is further configured to turn on a selected one of the first or second switches to begin an input phase, during which the inductor is connected to receive energy from the input source and a current in the inductor increases positively. The controller is further configured to determine a reversal time ("TX") during the input phase when the current in the inductor reverses polarity, and to terminate the input phase at or near a time Tend, where Tend is equal to TX+TS.

Another exemplary embodiment of the present disclosure is an apparatus for converting power. The apparatus converts power received via an input from an input source at an input voltage for delivery to a load via an output at an output voltage in a series of converter operating cycles. The apparatus includes an inductor for delivering energy from the input source to the output. The apparatus further includes a first series circuit having first and second terminals configured to be connected across the input and a first central node for connection to a first end of the inductor. The first series circuit includes a first switch connected between the first terminal and the first central node and a second switch connected between the second terminal and the first central node. The first central node being characterized by a first node capacitance. The apparatus further includes a second series circuit having first and second terminals configured to be connected across the output and a second central node for connection to a second end of the inductor, the second series circuit comprising a third switch connected between the first terminal and the second central node, the second central node being characterized by a second node capacitance. The apparatus further includes a controller configured to operate the switches in a series of converter operating cycles. The converting operating cycles include an input phase, during which a selected one of the first or second switches is conductive, the inductor is connected across the input source, and a current flowing in the inductor increases positively. The converting operating cycles further include an output phase, during which a selected one of the third or fourth switches is conductive, the inductor is connected to deliver current to the load, and the inductor current decreases. The converting operating cycles further include an energy recycling phase, during which the first and second switches are OFF and energy stored in the inductor is used to charge or discharge the first node capacitance. The controller is configured to adjust the duration of the input phase, and the amount of energy stored in the inductor at the end of the input phase, as a function of an amount of energy required to charge or discharge the first node capacitance during the energy recycling phase.

Another exemplary embodiment of the present disclosure is a method of converting power received via an input from an input source at an input voltage for delivery to a load via an output at an output voltage. The method includes using an inductor to deliver energy from the input source to the output in a series of converter operating cycles. The method further includes using a first series circuit to connect and disconnect a first end of the inductor to and from a selected one of either the input or the output and a central node connected to the first end of the inductor. The first series circuit comprising a first switch connected between the first terminal and the central node, and a second switch connected between the second terminal and the central node. The central node being characterized by a node capacitance. The method further comprising operating the switches in a series of converter operating cycles. The series of converter operating cycles include establishing an input phase, during which a selected one of the first or second switches is conductive, the inductor is connected to receive energy from the input source, and a current flowing in the inductor increases positively. The series of converter operating cycles further include establishing an energy recycling phase, during which the first and second switches are OFF, and energy stored in the inductor is used to charge or discharge the node capacitance. The series of converter operating cycles further includes adjusting the duration of the input phase, and the amount of energy stored in the inductor at the end of the input phase, as a function of an amount of energy required to charge or discharge the node capacitance during the energy recycling phase.

DETAILED DESCRIPTION

A category of buck-boost switching power converters are described in Vinciarelli, Buck-Boost DC-DC Switching Power Conversion, U.S. Pat. No. 6,788,033 issued Sep. 7, 2004 (the "Buck-Boost Patent"); a variety of switching power converters, including buck, boost, and buck-boost converters, are described in Vinciarelli, Adaptive Control of Switching Losses in Power Converters, U.S. Pat. No. 8,669,744, issued Mar. 11, 2014 (the "Adaptive Patent"); Buck and boost converters are described in Prager et al, Loss and Noise Reduction in Power Converters, U.S. Pat. No. RE40,072, reissued Feb. 19, 2008 (the "Clamped Patent"). Each of the aforementioned patents are assigned to VLT, Inc. and each is incorporated herein by reference in its entirety.

The converters described in the Buck-Boost Patent, the Adaptive Patent and the Clamped Patent each comprise an inductor and each transfer energy, via the inductor, between an input source and a load in a series of converter operating cycles. Each converter operating cycle may comprise a period during which energy, associated with a flow of negative current in the inductor, is trapped in the inductor by closing a switch, or switches, across the inductor (in the Buck-Boost and the Adaptive Patents the referenced period is referred to as the "clamp phase" or "clamped phase"). In order to establish a polarity convention applicable to both positive and negative ground converters, a positive polarity of inductor current is defined herein as being in a direction that would transfer energy to the load and a negative polarity of inductor current as being in a direction that would transfer energy to the input source.

Upon opening the clamp switch, the negative flow of current may be used for ZVS operation of one or more switches in the converter during an energy recycling interval ("ERP") (which may also be called a "ZVS" interval). ZVS ideally causes the voltage across the switch to decline to zero volts (full ZVS), essentially eliminating switching losses associated with the discharge of the voltage in capacitances across the switch; however, any significant reduction, e.g. 50 percent, 80 percent, 90 percent, or more from the peak voltage across the switch (partial ZVS), is beneficial in reducing the switching loss during turn ON by as much as 75 percent, 96 percent, 99 percent, respectively. Unless otherwise noted, the term "ZVS" as used herein refers to full and partial reduction of the switch voltage prior to turning the switch ON.

Figure 1:
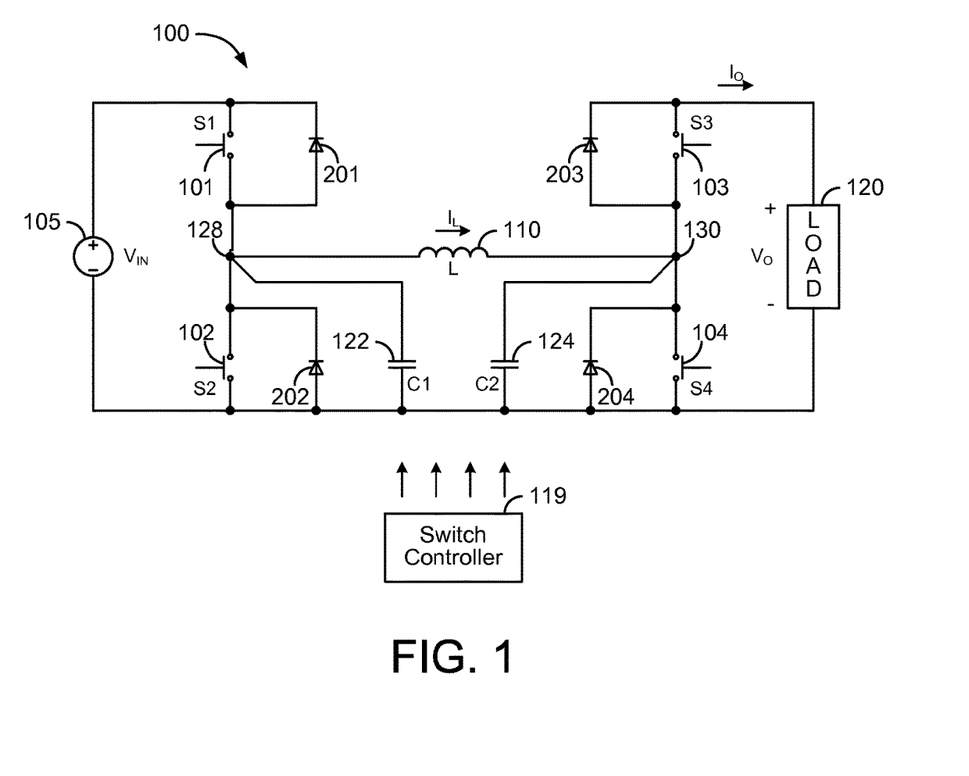
FIG. 1 shows a buck-boost switching power converter.
Figure 2A:
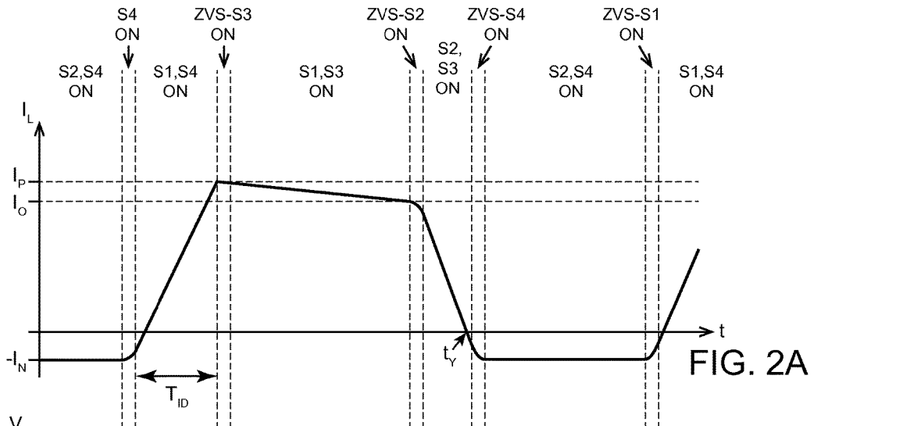
FIG. 2A-2C show waveforms for the converter of FIG. 1.
Figure 2B:
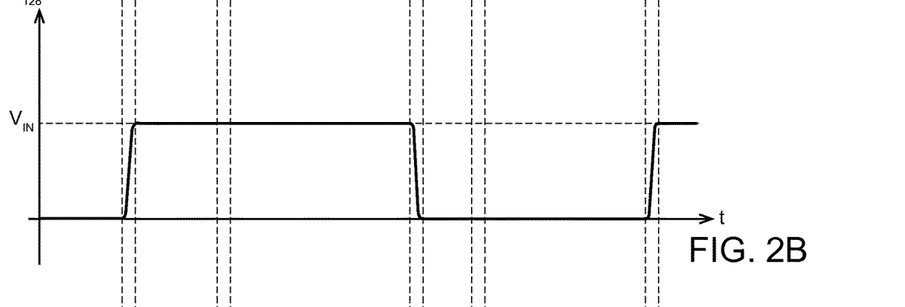
Figure 2C:
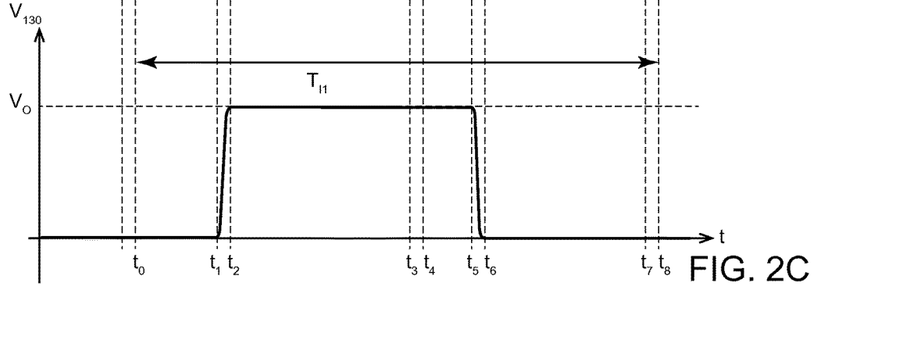

FIG. 1 shows a schematic of a buck-boost switching power converter 100. Converters using this power train topology are shown and described in the Buck-Boost and the Adaptive Patents. FIGS. 2A through 2C show switch states and waveforms during an operating cycle of the converter of FIG. 1. FIG. 2A shows the inductor current $I_L$ and switch states during the cycle; FIG. 2B shows the voltage at node 128; FIG. 2C shows the voltage at node 130. In FIGS. 2A-2C, an operating cycle begins at time t0 and ends at time t8=t0+T, where T is the converter operating period.

Referring to FIG. 2A-2C, there are four ZVS intervals, ZVS-S3 (t1-t2), ZVS-S2 (t3-t4), ZVS-S4 (t5-t6), and ZVS-S1 (t7-t8), during which the voltage across the respective switch (S3, S2, S4, and S1) may be reduced or eliminated just before it is turned ON at or after the end of the ZVS interval. Achieving ZVS of switch S4 during ZVS-S4 (t5-t6) and of switch S1 during ZVS-S1 (t7-t8) depends on the magnitude, $I_N$, of a negative inductor current flowing at time t5 (when S3 is turned OFF ending the freewheeling phase) and at time t7 (when S2 is turned OFF ending the clamp phase. As discussed in the Adaptive Patent, the magnitude of inductor current, $I_N$, flowing at time t5 may be adjusted by keeping switch S3 ON for a period of time after the inductor current $I_L$ passes though zero at time $t_y$ (FIG. 2A) (creating a "reverse energy phase", as that term is used in the Adaptive Patent, between times $t_y$ and t5). Thus, ZVS of switches S4 and S1 may be achieved by appropriately controlling the time, t5, at which switch S3 is turned off.

Referring to FIG. 1, ZVS operation of switch S2 102 requires discharging capacitance C1 122 at node 128 to a voltage at or near zero volts; ZVS of switch S3 103 requires charging capacitance C2 124 at node 130 to a voltage essentially equal to the output voltage, Vo. Achieving ZVS of switch S3 during ZVS-S3 (t1-t2) depends upon the magnitude of the inductor current, $I_P$, flowing at time t1 (when switch S4 is turned OFF ending the input phase); achieving ZVS of switch S2 during ZVS-S2 (t3-t4) depends upon the magnitude of the inductor current, $I_D$, that flows at time t3 (when switch S1 is turned OFF ending the input-output phase). The magnitude of the inductor current, $I_P$, flowing at time t1 is a function of the input voltage, Vin, the value, L, of inductance 110, and the duration of the "input phase" of the converter, $T_{ID}$=t1-t0 (FIG. 2A): $I_P=T_{ID}*(Vin/L)-I_N$ (the input phase of a buck-boost converter is defined for use herein as the interval in the converter operating cycle during which switches S1 101 and S4 104 are both ON). The magnitude of the inductor current, $I_D$, that flows at time t3 is a function of $I_P$, the duration of the input-output phase (t2-t3), and of the relative values of the input voltage, Vin, and the output voltage, Vo. Ignoring losses, $I_D$ will be less than $I_P$ if Vin is less than Vo (boost conversion) and $I_D$ will be greater than $I_P$ if Vin is greater than Vo (buck conversion).

Figure 3:
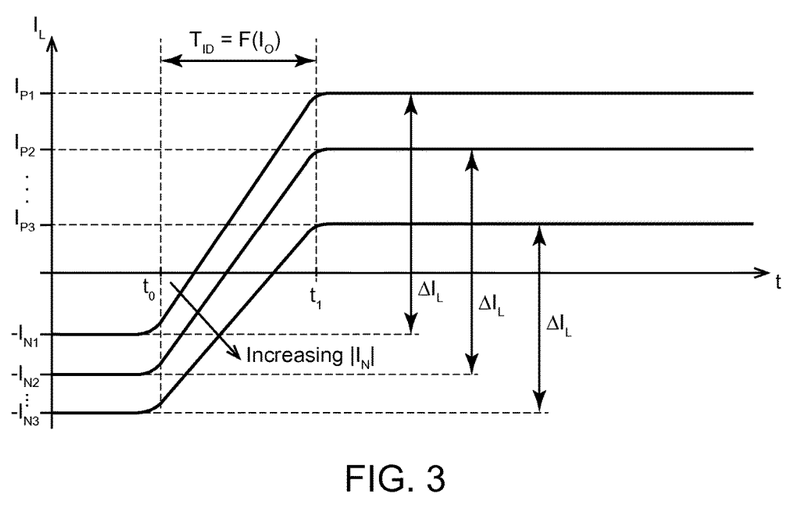
FIG. 3 shows characteristic portions of an operating cycle of the buck-boost topology using a prior art controller.

A typical prior art controller for the buck-boost topology may vary the duration of the input phase, $T_{ID}$, as a function of load current, increasing the duration as the load current increases and vice versa. Under such a control strategy, as the load current decreases, the magnitude of the inductor currents $I_P$ and $I_D$ also decrease and eventually, one or both of $I_P$ and $I_D$ will fall below a level required for reasonably effective ZVS operation of switch S3 or S2, respectively. The impact on ZVS at light loads may be exacerbated as the magnitude of inductor current $I_N$ increases. FIG. 3, for example, shows waveforms for the input phase portion of the inductor current, each at the same value of load current, Io, but at a different value of $I_N$. As illustrated in FIG. 3, a fixed value of $T_{ID}$ will produce a fixed excursion in inductor current, $\Delta I_L$, resulting in a decrease in the magnitude of $I_P$ as $I_N$ is increased. Thus, the load current at which ZVS is compromised will increase with increasing $I_N$. Under conditions where the inductor current, $I_P$ or $I_D$, is insufficient to achieve an acceptable level of ZVS of respective switch, S3 or S2, other measures, such as reducing the operating frequency, may need to be implemented to manage the effects of increased power dissipation on conversion efficiency and prevent overheating and possible failure of switches S2 and S3.

For converters operating at relatively low voltages (e.g., Vin=48V), the energy stored in parasitic switch capacitances ($E=\frac{1}{2}*C*V^2$) may be low relative to the maximum load current producing relatively little impact on the current, $I_P$ and $I_D$, making ZVS of switches S2 and S3 achievable over a relatively wide range of loads. In other words, at low voltages a relatively small amount of negative current is required for ZVS operation of switches S4 and S1 having a relatively small impact on the sensitivity of ZVS operation of switches S2 and S3 to reductions in load current. However, in converters operating at higher voltages (e.g., Vin=300V), the energy stored in parasitic switch capacitances, and hence the magnitude, $I_N$, of negative current required for ZVS operation of switches S4 and S1 may be high relative to the maximum load current, producing relatively large effects on the current $I_P$ and $I_D$ and thus leading to the loss of ZVS of switches S2 and S3. In other words, at high voltages a relatively large amount of negative current is required for ZVS operation of switches S4 and S1 having a relatively large impact on the sensitivity of ZVS operation of switches S2 and S3 to reductions in load current.

Figure 7:
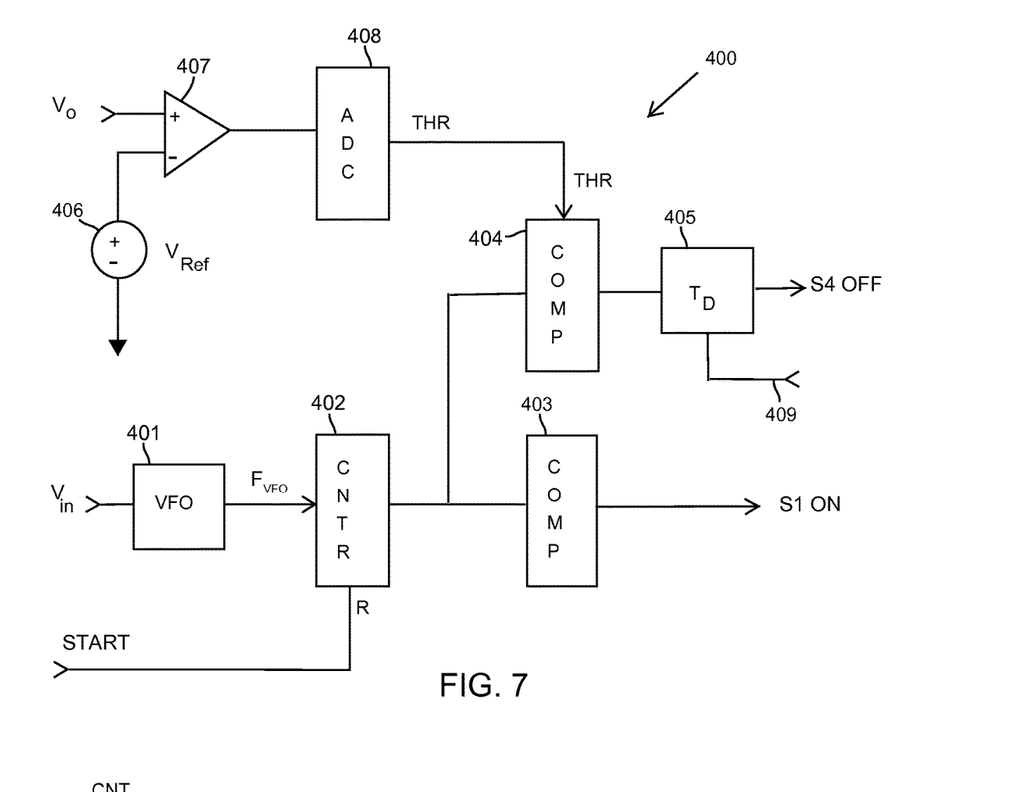
FIG. 7 shows a block diagram of an improved controller.

In FIG. 1, the switch controller 119 of buck-boost converter 100 may implement a control strategy for adjusting the duration of the input phase, and the amount of energy stored in the inductor at the end of the input phase, as a function of energy required to ensure ZVS of switches S2 and S3 (hereinafter called an adaptive input-phase controller or "AIPC"). Referring to FIG. 7, a first example of the AIPC portion 400 of controller 119 (FIG. 1) is shown including a counter 402 having an input connected to receive pulses from the output of variable frequency oscillator ("VFO") 401. The VFO 401 as shown senses the input voltage, Vin, and increases the frequency, $F_{VFO}$, of output pulses to the counter 402 with increases in input voltage, and conversely decreases $F_{VFO}$ with decreasing input voltage. Accordingly, the counter 402 will count faster or slower depending on the magnitude of the input voltage, Vin.

Error amplifier 407 compares the output voltage, Vo, to the desired output voltage established by the reference voltage 406, Vref, generating an error signal which is shown fed to the input of analog to digital converter ("ADC") 408. The ADC 408 produces a digital representative of the error (THR=f(Vo−Vref)) which is fed to the input of comparator 404. Comparators 403 and 404, which may be digital comparators, each compare the count of counter 402 to a respective threshold count. The threshold count for comparator 403, shown as 0 for convenience, may be used to turn ON switch S1, to start the input phase. Comparator 404, which uses the output of ADC 408 to set its threshold count, THR, may be used to turn switch S4 OFF to typically end the input phase.

Figure 8:
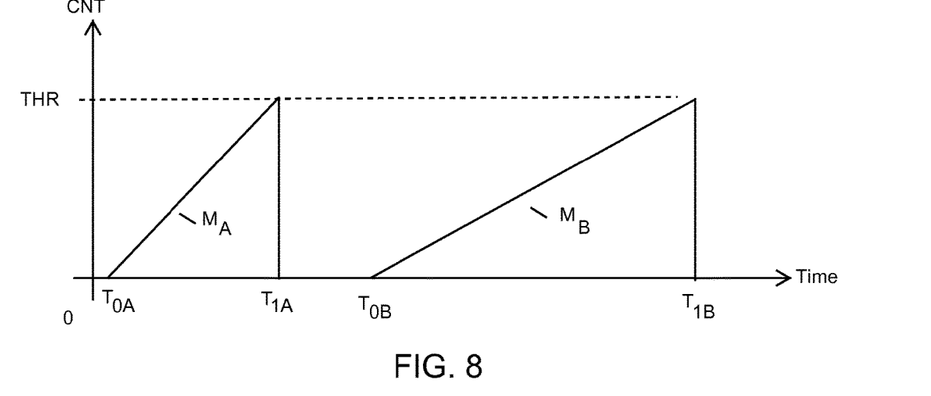
FIG. 8 shows characteristic portions of a timing cycle of the improved controller.

FIG. 8 shows the count of counter 402 versus time in two exemplary operating cycles in which the input phase begins at time t0 ($T_{0A}$ and $T_{0B}$), which is shown as a zero count (CNT=0), and ends at time t1 ($T_{1A}$ and $T_{1B}$) which is shown as a final count (CNT=THR). The two operating cycles are shown having different slopes, $M_A$ and $M_B$, for the count line versus time to illustrate the effect of input voltage on input phase duration: the higher input voltage (greater $F_{VFO}$) in the first operating cycle creates a greater slope, $M_A$, in the count ramp (CNT vs. time) resulting in a shorter duration ($T_{0A}$-$T_{0A}$) for the input phase compared with the lower input voltage (lower $F_{VFO}$) in the second operating cycle creates a lower slope, $M_B$, in the count ramp resulting in a longer duration ($T_{1A}$-$T_{1B}$) for the input phase. Thus the duration of the interval between CNT=0 and CNT=THR will depend on the value of the error (THR=f(Vo−Vref)) and the magnitude of the input voltage ($F_{VFO}$=f(Vin)) $t_{0A}$ and $t_{1B}$. The counter 402 may be reset to zero, using the start signal shown in FIG. 7 at the beginning of the input phase. Thus the AIPC 400 may set the duration, $T_{ID}$, of the input phase as a function of the error signal (voltage error is also a function of load current) and the input voltage.

To compensate for the effects of negative inductor current, $I_N$, discussed above, a delay block 405, may be connected as shown in FIG. 7 between the output of comparator 404 and switch S4. The delay block 405 may be configured to delay turning OFF switch S4 (for the duration of the delay, Td) thereby extending the input phase and increasing the currents $I_P$ and $I_D$. The duration of the delay, Td, may be fixed, e.g. predetermined by design or during manufacture for specific operating conditions; variable, or a combination of fixed and variable, to ensure that $I_P$ is always at or above the magnitude required to achieve ZVS of switch S3, particularly at low loads, and in the case of boost conversion to ensure that $I_D$ is also at or above a magnitude required to achieve ZVS of switch S2. By way of example, the delay may (a) be varied inversely proportional to Vin; (b) be a function of load current, e.g. minimized at loads above a threshold and increasing below the threshold to a maximum required to ensure ZVS operation; or (c) a function of negative inductor current, $I_N$. As shown in FIG. 7, the delay block may include an optional input 409 to sense one or more of the parameters discussed above.

Figure 9:
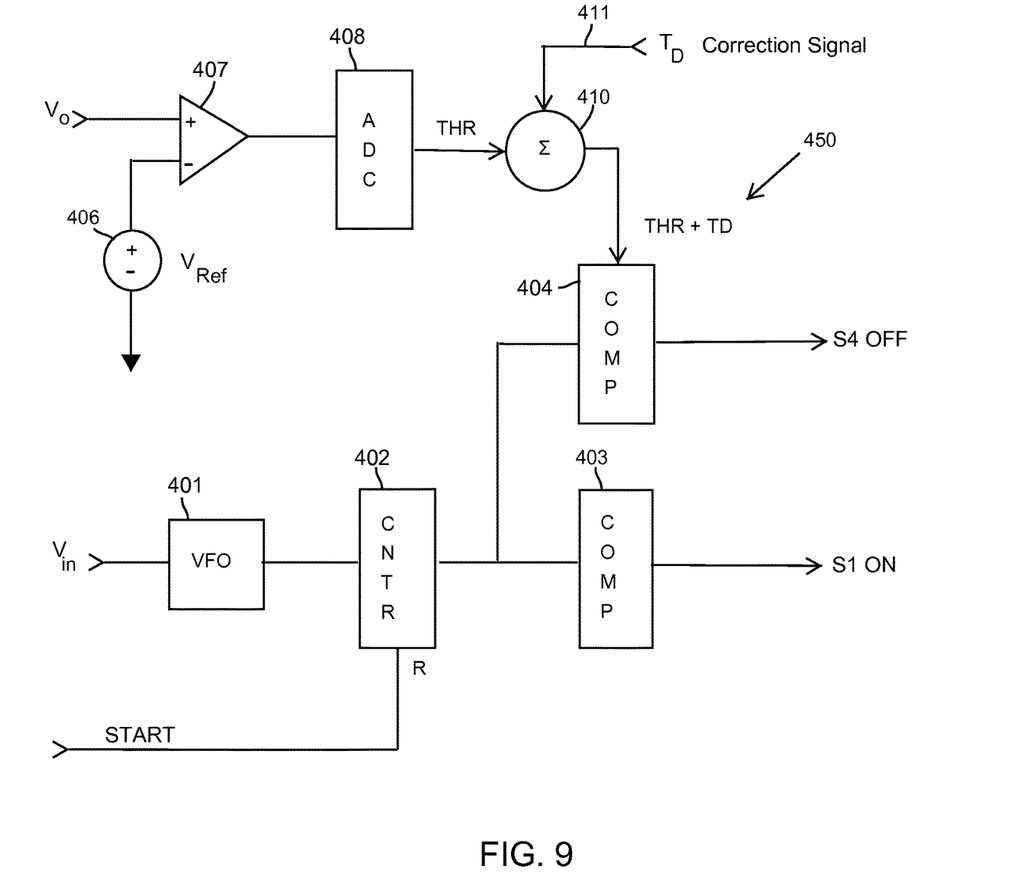
FIG. 9 shows an alternate embodiment of the improved controller of FIG. 7.

Referring to FIG. 9, an alternate embodiment of an AIPC controller 450 is shown including a summer 410 following the ADC 408 instead of the delay block 405 in FIG. 7. The summer 410 includes an input 411 for receiving a correction signal TD and an input connected to the ADC output. The AIPC controller 450 operates in a similar fashion to controller 400 (FIG. 7) except that the threshold count input to comparator 404 is the sum of the ADC output, THR, and TD which being a function of any of the parameters discussed above in connection with FIG. 7 extends the input phase beyond that required by the load to compensate for negative current. For example, the output of summer 410 may include the duration set by the error signal THR plus the requisite correction, TD, for light load and negative current, resulting is a higher count threshold (THR+TD) thus extending the input phase.

Figure 4:
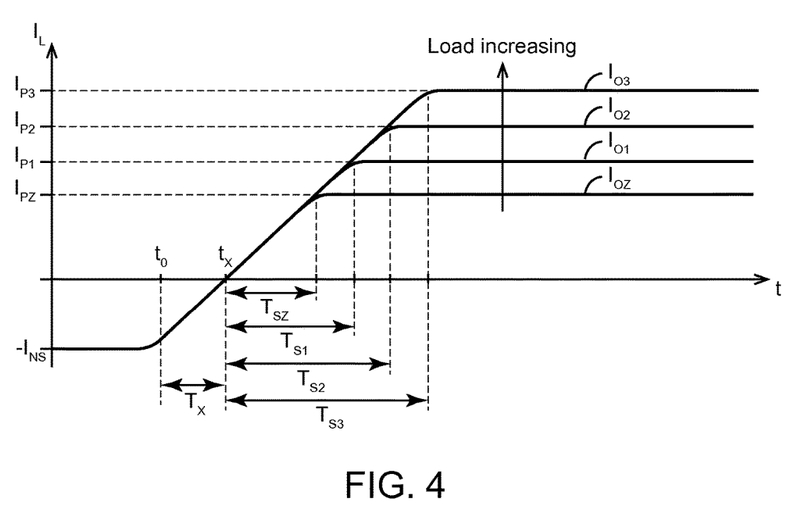
FIG. 4 shows characteristic portions of an operating cycle of the converter of FIG. 1 using an improved controller.
Figure 10:
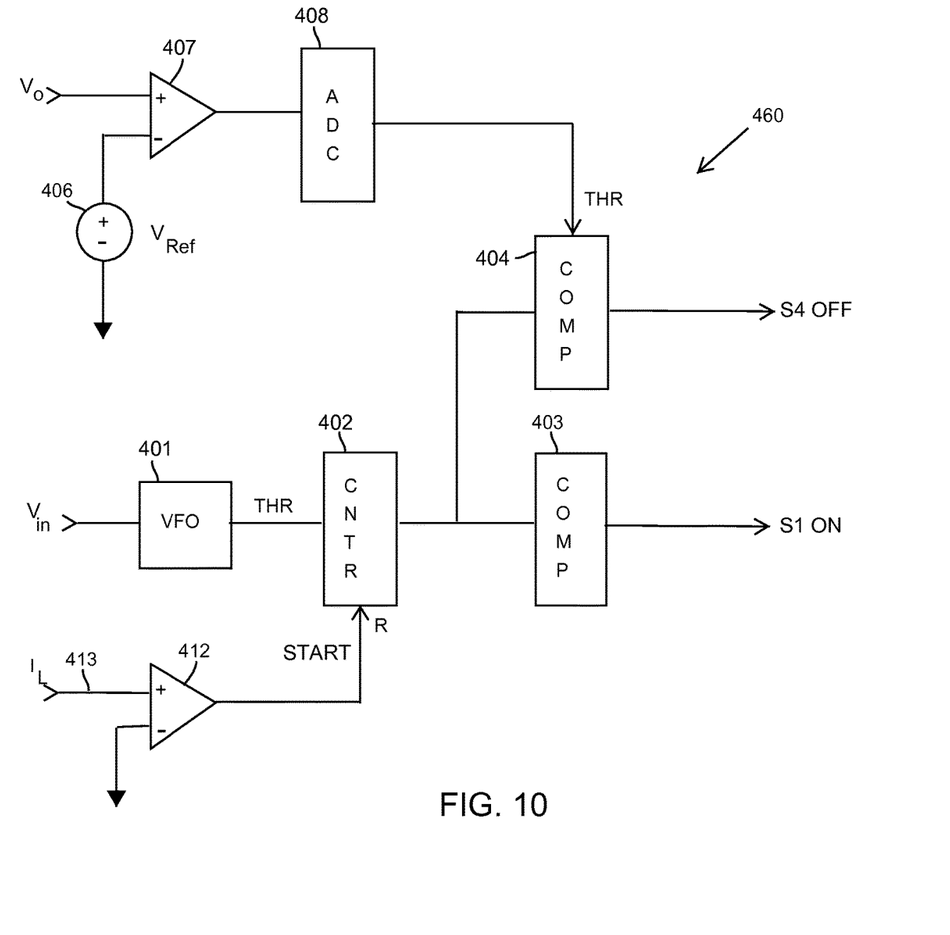
FIG. 10 shows a further alternate embodiment of the improved controller of FIG. 7.

Referring to FIG. 4, which shows the input phase portion of the inductor current waveform at several different values of load $Io_3>Io_2>Io_1>Io_Z$. Switch S4 remains ON from the preceding clamp phase and switch S1 is turned ON at time $t_0$, beginning the input phase. The initially negative inductor current, $I_N$, ramps up positively during the period $T_X$, reaching a value of zero at time $t_x$. FIG. 10 shows another embodiment of an AIPC controller 460 configured to implement a control strategy such as that shown in FIG. 4. Controller 460 is shown including an error amplifier 412 having an input 413 to sense the inductor current and an output (Start) connected to keep the counter 402 in a reset condition (CNT=0). The error amplifier 412 may sense when the negative inductor current crosses zero to positive at time $T_X$, allowing the counter 402 to begin counting up toward the threshold THR. It will be appreciated that the controller 460 allows switch S1 to be turned ON at t0 while the counter 402 is held at the zero count (CNT=0) allowing the input phase to begin, but delays operation of the counter 402 until the inductor current reaches zero at time $T_X$. Thus, the AIPC controller 460 establishes a compensation phase, $T_X$, during which the negative inductor current is returned to zero, followed by a storage phase of duration $T_S$ (FIG. 4) during which the energy determined by the error signal (THR) and the input voltage ($F_{VFO}$) is stored in the inductor to ensure proper ZVS operation of switches S2 and S3.

The flow of positive current during the storage phase is associated with transfer of energy from the input source 105 (FIG. 1) to the inductor 110. As load increases, the AIPC 460 increases the length of the storage phase: $T_{S3}>T_{S2}>T_{S1}>T_{SZ}$ (FIG. 4). The AIPC 460 may also set a minimum duration of the storage phase, $T_{SZ}$ (FIG. 4) in the event the load drops below the minimum required for ZVS operation switches S2 and S3, e.g. by preventing the storage phase from decreasing below $T_{SZ}$. Alternatively, the AIPC 460 may determine a length of the storage phase as a function of load and add an additional ZVS component to the duration of the input phase, the duration of the ZVS component increasing as a function of decreasing load.

In some embodiments the AIPC 460 may estimate the amount of time required for the compensation phase, e.g., based upon the value of $I_N$ rather than detecting the zero crossing as shown in FIG. 10.

Figure 5:
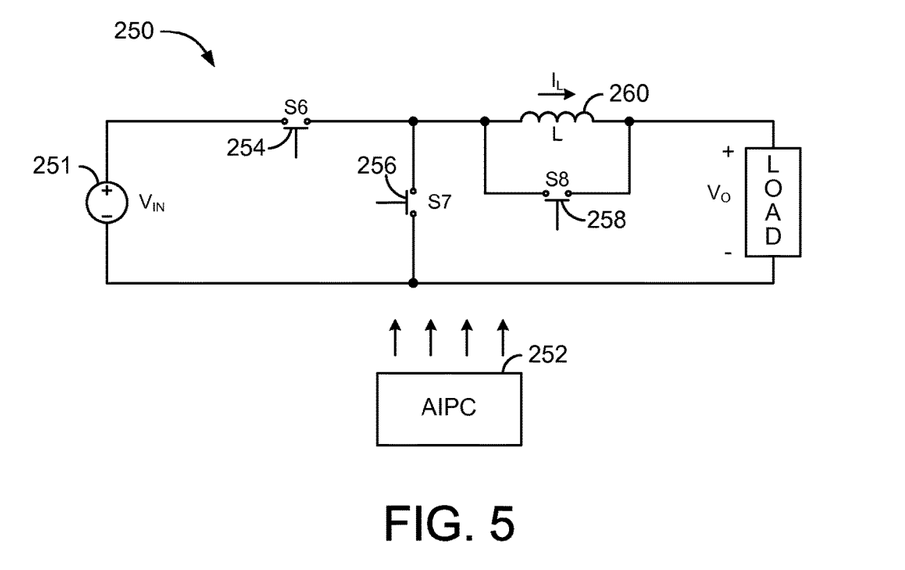
FIG. 5 show a buck switching power converter.
Figure 6:
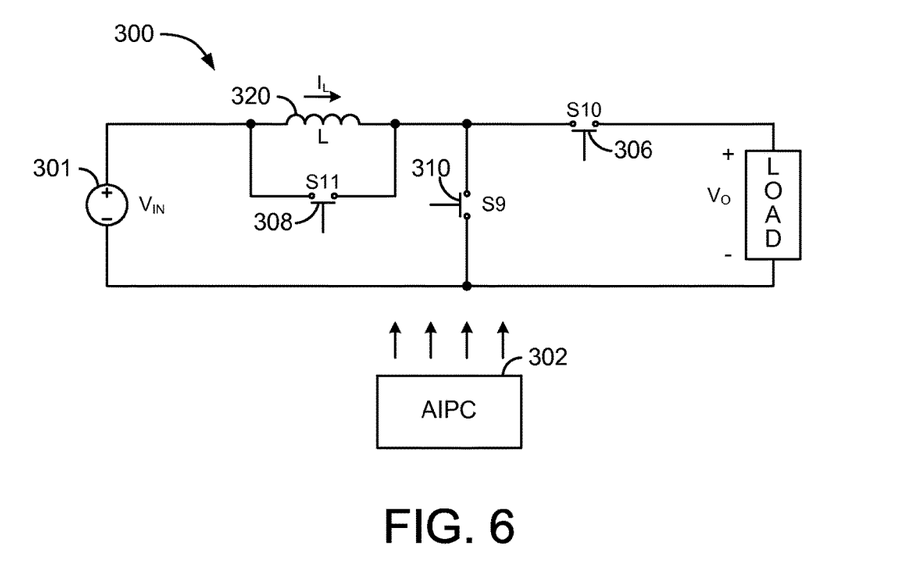
FIG. 6 shows a boost switching power converter.

Although the preceding description describes implementation of the invention in a buck-boost converter it is also applicable to other converter topologies. For example, FIG. 5 shows a buck converter 250 comprising a clamp switch S8 258 and an AIPC controller 252; FIG. 6 shows a boost converter 300 comprising a clamp switch S10 306 and an AIPC controller 302. Operation of these types of converters are described in the Clamped Patent and in the Adaptive Patent. In each of the converters, a switch (S6 254 (FIG. 5), S11 308 (FIG. 6)) is turned on at a time when negative current may be flowing in its respective inductor 260, 320 (the "input phase" in the buck converter 250 lasts for the duration of time that switch S6 is on; the "input phase" in the boost converter 300 lasts for the duration of time that switch S11 is on). If determination of the duration of the on-times of switches S6 and S11 does not account for the magnitude of the negative current at the beginning of the input phase, or for the minimum inductive energy required to achieve subsequent ZVS of switches S7 256, S10 306, over the range of converter operating conditions, excessive switch dissipation may occur, reducing converter efficiency and possibly resulting in switch failure. Incorporating an AIPC 252, 302, operating according to the principles described above, may enable safe and efficient converter operation over a wide range of loads.

For the purposes of the present disclosure, values may be considered "equal," "substantially equal," "essentially equal," "at or near" one another, etc. when the values are exactly equal to or nearly equal to one another. In some embodiments, the values may be considered equal or nearly equal if the values are within a threshold of one another. For example, two intervals may be considered to have essentially equal duration if the intervals are within a threshold duration of one another (e.g., five nanoseconds 10 nanoseconds, 20 nanoseconds, etc.). In another example, a voltage, current, or other value may be "at or near" zero (or any other value) if the voltage/current is within a threshold value of zero (e.g., within five hundred milliamps, a tenth of an amp, a five volts, ten volts, etc.). In another example, for the purpose of zero voltage switching or zero current switching, the switch voltage or current may be considered to be at or near zero if it has been significantly reduced from the typical peak value (e.g., reduced to 5 percent, 10 percent, 20 percent, or less of the peak voltage or current).

A number of embodiments of the invention have been described. Nevertheless, it will be understood that various modifications may be made without departing from the spirit and scope of the invention. For example, a wide variety of converter topologies and control techniques may be used. The clamp switch may comprise a plurality of switches configured to shunt the resonant capacitor when activated. The output current may increase during the clamp phase due to increases in magnetizing current in other converter topologies.

The disclosure is described above with reference to drawings. These drawings illustrate certain details of specific embodiments that implement the systems, apparatus, and/or methods of the present disclosure. However, describing the disclosure with drawings should not be construed as imposing on the disclosure any limitations that may be present in the drawings. No claim element herein is to be construed as a "means plus function" element unless the element is expressly recited using the phrase "means for." Furthermore, no element, component or method step in the present disclosure is intended to be dedicated to the public, regardless of whether the element, component or method step is explicitly recited in the claims.

It should be noted that although the disclosure provided herein may describe a specific order of method steps, it is understood that the order of these steps may differ from what is described. Also, two or more steps may be performed concurrently or with partial concurrence. It is understood that all such variations are within the scope of the disclosure.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and its practical application to enable one skilled in the art to utilize the disclosure in various embodiments and with various modifications as are suited to the particular use contemplated.

What is claimed is:

1. An apparatus for converting power received via an input from an input source at an input voltage for delivery to a load via an output at an output voltage in a series of converter operating cycles, the apparatus comprising:

an inductor for delivering energy from the input source to the output;

a first series circuit having first and second terminals configured to be connected across either the input or the output and a central node for connection to a first end of the inductor, the first series circuit comprising a first switch connected between the first terminal and the central node and a second switch connected between the second terminal and the central node, the central node being characterized by a node capacitance; and a controller configured to operate the switches in a series of converter operating cycles, the converter operating cycles comprising:

an input phase, during which a selected one of the first or second switches is conductive, the inductor is connected to receive energy from the input source, and a current flowing in the inductor increases positively;

an energy recycling phase, during which the first and second switches are OFF and energy stored in the inductor is used to charge or discharge the node capacitance;

wherein the controller is configured to adjust the duration of the input phase, and the amount of energy stored in the inductor at the end of the input phase, as a function of an amount of energy required to charge or discharge the node capacitance during the energy recycling phase.

2. The apparatus of claim 1 wherein the controller is further adapted to sense an initial current flowing in the inductor at the start of the input phase and adjust the duration of the input phase to compensate for the initial current.

3. The apparatus of claim 2 wherein the controller extends the duration of the input phase by an amount of time required to return the initial current to zero.

4. The apparatus of claim 3 wherein the input phase comprises a compensation phase during which the initial current is returned to zero and a storage phase during which energy to be delivered to the load is stored in the inductor.

5. The apparatus of claim 4 wherein the compensation phase further includes storing zero voltage switching (ZVS) energy in the inductor for a subsequent energy recycling phase.

6. The apparatus of claim 4 wherein the controller is adapted to set a duration for the storage phase as a function of an error signal or the current delivered to the load and adjusts the duration of the compensation phase as a function of the initial current.

7. The apparatus of claim 6 wherein the controller begins the storage phase at a time at or after the inductor current passes through zero.

8. The apparatus of claim 6 wherein the controller establishes the compensation phase by setting a delay for the beginning of the storage phase, the delay being estimated as a function of the initial current.

9. The apparatus of claim 6 wherein the compensation phase is established as a delay for the beginning of the storage phase, the delay being ended with detection of the inductor current approaching zero or passing through zero.

10. The apparatus of claim 1 wherein the first series circuit is connected across the input and the output voltage is less than the input voltage.

11. The apparatus of claim 1 wherein the first series circuit is connected across the output and the output voltage is greater than the input voltage.

12. The apparatus of claim 1 wherein the first series circuit is connected across the input and the apparatus further comprises:

a second series circuit having first and second terminals configured to be connected across the output and a central node for connection to a second end of the inductor, the second series circuit comprising a third switch connected between the first terminal and the central node and a fourth switch connected between the second terminal and the central node, the central node being characterized by a second node capacitance.

13. The apparatus of claim 12 wherein the first terminal of the first series circuit is connected to a positive terminal of the input source, the second terminal of the first series circuit is connected to a negative or neutral terminal of the input source, and the energy stored in the inductor is used to reduce the voltage across the first switch during the energy recycling phase.

14. The apparatus of claim 1 wherein the controller delays ending the input phase for a predetermined amount of time.

15. The apparatus of claim 1 wherein the controller delays ending the input phase for an amount of time, TD, that is a function of a selected one or more of the following operating conditions: (a) an initial current flowing in the inductor at the start of the input phase, (b) an output current being delivered to the load, (c) the input voltage, (d) a voltage difference between the input voltage and the output voltage.

16. The apparatus of claim 15 wherein TD is a function of the initial current.

17. The apparatus of claim 15 wherein TD is a function of the output current.

18. An apparatus for converting power received via an input from an input source at an input voltage for delivery to a load via an output at an output voltage in a series of converter operating cycles, the apparatus comprising:

an inductor for delivering energy from the input source to the output;

a first series circuit having first and second terminals configured to be connected across the input and a central node for connection to a first end of the inductor, the first series circuit comprising a first switch connected between the first terminal and the central node and a second switch connected between the second terminal and the central node, the central node being characterized by a node capacitance;

a second series circuit having first and second terminals configured to be connected across the output and a central node for connection to a second end of the inductor, the second series circuit comprising a third switch connected between the first terminal and the central node and a fourth switch connected between the second terminal and the central node, the central node being characterized by a second node capacitance; and a controller configured to operate the switches in a series of converter operating cycles;

wherein the controller is configured to:

determine a storage duration ("TS") for storing energy in the inductor as a function of a current delivered to the load;

turn on a selected one of the first or second switches to begin an input phase, during which the inductor is connected to receive energy from the input source and a current in the inductor increases positively;

determine a reversal time ("TX") during the input phase when the current in the inductor reverses polarity; and terminate the input phase at or near a time Tend, where Tend=TX+TS.

19. The apparatus of claim 18 wherein the converter operating cycle comprises an energy recycling phase, during which the first and second switches are OFF and energy stored in the inductor is used to charge or discharge the node capacitance, and the controller is configured to adjust the duration of the input phase, and the amount of energy stored in the inductor at the end of the storage phase, as a function of a current delivered to the load and an amount of energy required to charge or discharge the node capacitance during the energy recycling phase.

20. An apparatus for converting power received via an input from an input source at an input voltage for delivery to a load via an output at an output voltage in a series of converter operating cycles, the apparatus comprising:
   an inductor for delivering energy from the input source to the output;
   a first series circuit having first and second terminals configured to be connected across the input and a first central node for connection to a first end of the inductor, the first series circuit comprising a first switch connected between the first terminal and the first central node and a second switch connected between the second terminal and the first central node, the first central node being characterized by a first node capacitance;
   a second series circuit having first and second terminals configured to be connected across the output and a second central node for connection to a second end of the inductor, the second series circuit comprising a third switch connected between the first terminal and the second central node and a fourth switch connected between the second terminal and the second central node, the second central node being characterized by a second node capacitance; and
   a controller configured to operate the switches in a series of converter operating cycles, the converter operating cycles comprising:
   an input phase, during which a selected one of the first or second switches is conductive, the inductor is connected across the input source, and a current flowing in the inductor increases positively;
   an output phase, during which a selected one of the third or fourth switches is conductive, the inductor is connected to deliver current to the load, and the inductor current decreases;
   an energy recycling phase, during which the first and second switches are OFF and energy stored in the inductor is used to charge or discharge the first node capacitance;
   wherein the controller is configured to adjust the duration of the input phase, and the amount of energy stored in the inductor at the end of the input phase, as a function of an amount of energy required to charge or discharge the first node capacitance during the energy recycling phase.

21. A method of converting power received via an input from an input source at an input voltage for delivery to a load via an output at an output voltage, the method comprising:
   using an inductor to deliver energy from the input source to the output in a series of converter operating cycles;
   using a first series circuit to connect and disconnect a first end of the inductor to and from a selected one of either the input or the output, the first series circuit having first and second terminals connected across the selected one of either the input or the output and a central node connected to the first end of the inductor, the first series circuit comprising a first switch connected between the first terminal and the central node, and a second switch connected between the second terminal and the central node, the central node being characterized by a node capacitance; and
   operating the switches using the series of converter operating cycles, comprising:
   establishing an input phase, during which a selected one of the first or second switches is conductive, the inductor is connected to receive energy from the input source, and a current flowing in the inductor increases positively;
   establishing an energy recycling phase, during which the first and second switches are OFF and energy stored in the inductor is used to charge or discharge the node capacitance; and
   adjusting the duration of the input phase, and the amount of energy stored in the inductor at the end of the input phase, as a function of an amount of energy required to charge or discharge the node capacitance during the energy recycling phase.

22. The method of claim 21, further comprising:
   extending the duration of the input phase by an amount of time required to return the initial inductor current to zero.

23. The method of claim 22, further comprising:
   establishing a compensation phase, during which the current in the inductor is returned to zero; and
   establishing a storage phase, during which the energy to be delivered to the load is stored in the inductor.

24. The method of claim 23, wherein the compensation phase further includes storing zero voltage switching (ZVS) energy in the inductor for a subsequent energy recycling phase.

25. The method of claim 23, further comprising:
   setting a duration for the storage phase as a function of an error signal or the current delivered to the load; and
   adjusting the duration of the compensation phase as a function of the initial current.

26. The method of claim 25, wherein the storage phase begins at a time at or after the inductor current passes through zero.

27. The method of claim 26, wherein the storage phase begins at a time after the inductor current passes through zero.

* * * * *